F. W. CARPENTER.
NUT-LOCK.
No. 172,967. Patented Feb. 1, 1876.
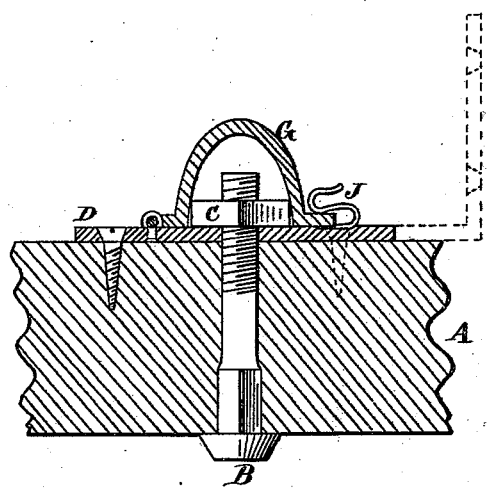
WITNESSES  
Henry N. Miller  
Franck L. Ourand
INVENTOR  
F. W. Carpenter.  
Alexander & Mason  
Attorneys

UNITED STATES PATENT OFFICE.

FRANCIS W. CARPENTER, OF HARRISON, NEW YORK.

IMPROVEMENT IN NUT-LOCKS.

Specification forming part of Letters Patent No. 172,967, dated February 1, 1876; application filed January 22, 1876.

*To all whom it may concern:*

Be it known that I, F. W. CARPENTER, of Harrison, in the county of Westchester and in the State of New York, have invented certain new and useful Improvements in Nut-Locks; and do hereby declare that the following is a full, clear, and exact description thereof, reference being had to the accompanying drawings, and to the letters of reference marked thereon, making a part of this specification.

My invention relates to nut-locks; and it consists in a tapering cap, attached to a washer, plate, or bar under the nut, and passing over the nut and end of the bolt, to hold the nut in whatever position it may be placed, as will be hereinafter more fully set forth.

In order to enable others skilled in the art to which my invention appertains to make and use the same, I will now proceed to describe its construction and operation, referring to the annexed drawing, which represents a section of my invention.

A represents a bar or any other article, through which is passed an ordinary bolt, B. C is the usual nut screwed on the end of the bolt. D represents a washer, plate, bar, or other similar article, placed against the bar A, and through which the end of the bolt passes before the nut C is screwed thereon. If, by the construction of the parts through which the bolt B passes, this washer, plate, or bar D is prevented from turning, it need not be fastened; but if said washer should be liable to turn, it is to be fastened to the bar A by means of screws, nails, or other suitable means, as shown in the drawing. To the washer D is hinged a cap, G, which closes over the nut and end of the bolt, and is held by a spring-catch, J, as shown. The interior of this cap is round, and tapering upward, so that in whatever position the nut may be the cap will, when closed, bind on the upper corners of the nut, and hold the same firmly in place, preventing it from coming loose. Even if the cap should not bind on the nut, it will readily be seen that the nut cannot unscrew on account of the tapering form of the cap.

An interior thimble may be used in the cap to adapt it to different-sized nuts.

It is, of course, immaterial, as regards the locking of the nut, whether the top of the cap is closed, as shown, or open; but I prefer a closed cap, as that prevents dirt, dust, snow, &c., from coming on the end of the bolt, and working in between the bolt and nut.

This nut-lock may be applied to any and every place where it is desired to lock the nut in place.

The cap need not, necessarily, be hinged. It may be attached in any suitable manner to the washer D.

When the cap is closed at top it need not be tapering, as the nut is by the closed cap prevented from working off.

Having thus fully described my invention, what I claim as new, and desire to secure by Letters Patent, is—

1. In combination with a bolt and nut, I claim a removable cap, arranged to close over, but disconnected from, the nut and end of the bolt, for the purposes herein set forth.

2. The combination, with a bolt, B, and nut C, of the washer D, tapering cap G, and holding device J, substantially for the purposes herein set forth.

In testimony that I claim the foregoing, I have hereunto set my hand this 22d day of January, 1876.

FRANCIS W. CARPENTER.

Witnesses:
M. L. STOWELL,
H. A. HALL.